(12) United States Patent
Dikhit (10) Patent No.: US 7,254,778 B2
(45) Date of Patent: Aug. 7, 2007

(54) SYSTEM AND METHOD BROWSING A NETWORK TOPOLOGY USING A CHARACTER DRIVEN INTERFACE

(75) Inventor: Aniruddh Singh Dikhit, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 537 days.

(21) Appl. No.: 10/229,532

(22) Filed: Aug. 27, 2002

(65) Prior Publication Data

US 2004/0041833 A1 Mar. 4, 2004

(51) Int. Cl.
*G06F 13/00* (2006.01)
*G06F 15/00* (2006.01)
(52) U.S. Cl. ........................ 715/736; 709/223; 715/738
(58) Field of Classification Search ................ 715/853, 715/736, 737, 738, 744, 740, 742; 709/209, 709/223
See application file for complete search history.

(56) References Cited

U.S. PATENT DOCUMENTS 5,295,244 A * 3/1994 Dev et al. .................... 715/853
6,839,747 B1 * 1/2005 Blumenau et al. .......... 709/223

* cited by examiner

*Primary Examiner*—Cao (Kevin) Nguyen
(74) *Attorney, Agent, or Firm*—Martine Penilla & Gencarella, LLP (57) ABSTRACT

In a computer network system, a command line interface system is described having a text-based browser for browsing details of host devices coupled to the network. The command line interface system data includes logic to monitor and manage network devices by allowing a user to traverse the network using text-based commands to view hierarchy and topology information of the network and the hosts. The command line interface browsing system advantageously ensures a command status state change in one hierarchy level of the host device being browsed is retained and communicated to other hierarchy levels as the user browses the network.

8 Claims, 10 Drawing Sheets

SYSTEM AND METHOD BROWSING A NETWORK TOPOLOGY USING A CHARACTER DRIVEN INTERFACE

FIELD OF THE INVENTION

The present claimed invention relates generally to the field of computer network systems. More particularly, embodiments of the present claimed invention relate to text based browser management of network systems.

BACKGROUND ART

The use of distributed computer systems has been gaining mass appeal over the last few years. The need for enterprises to more effectively use corporate resources and the desire to locate employees at various remote locations from corporate headquarters, pose challenges for most system administrators. In these distributed network systems, the need to keep the network available without constant interruptions is very important. Thus, the need to also manage and monitor the network has become a critical function in many enterprises. Changes in computer interconnect technology are creating new possibilities for managing and monitoring computer network architecture to ensure uninterrupted availability of corporate networks.

These new high performance networking management systems make it possible to manage network workloads and devices and to response to system failures in an expedited manner.

Figure 1A:
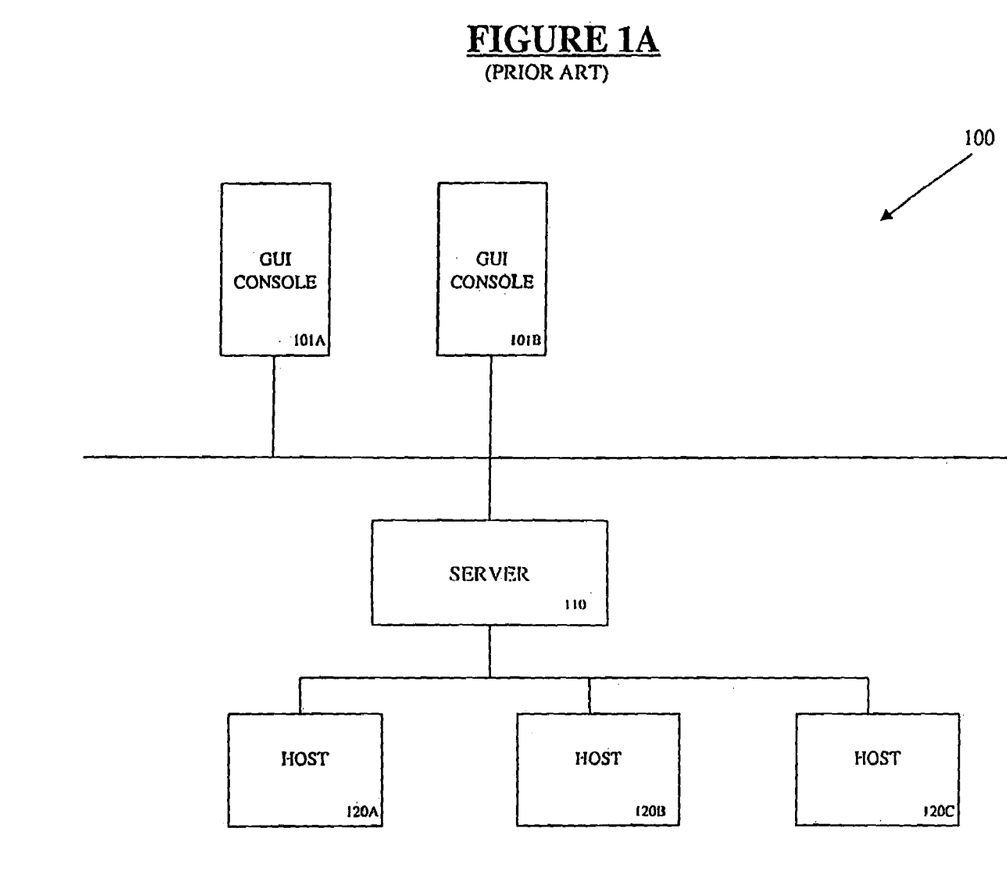
FIG. 1A is a block diagram of a prior art computer network system.

FIG. 1A is a prior art depiction of a network management system 100. The prior art system illustrated in FIG. 1A comprises three layer component of a console layer 101A-101B, a server layer 110 and a host layer 120A-120C.

The console layer 101A-101B comprises multiple consoles serving multiple users for the network management system 100. The consoles 101A-101B provide visual representations of managed objects (for example, hosts and networks) to users of the network management system 100. The consoles 101A-101B also provide users with the ability to manipulate attributes and properties associated with the managed objects and the ability to initiate management tasks (for example, dynamic reconfiguration of a host or a device).

The server layer 110 accepts requests from users through the consoles 101A-101B and passes these requests to the appropriate host. The server 110 then relays the response from the agent back to the user. For example, if a user wants information on the number of users accessing a host, the server 110 receives this request from any one of console 101A-101, and sends the request to that particular host. The host finds the requested information and passes it back to the server which then transmits the information to the user via the console 101A-101B. The server 110 also provides the console 101A-101B with a secure entry point to interface with the hosts 120A-120C.

The hosts 120A-120C perform the actual tasks of information gathering, monitoring and management of objects on the nodes managed by the network management system 100. The server 110 interacts with the hosts 120A-120C to gain access to managed objects on the network.

Figure 1B:
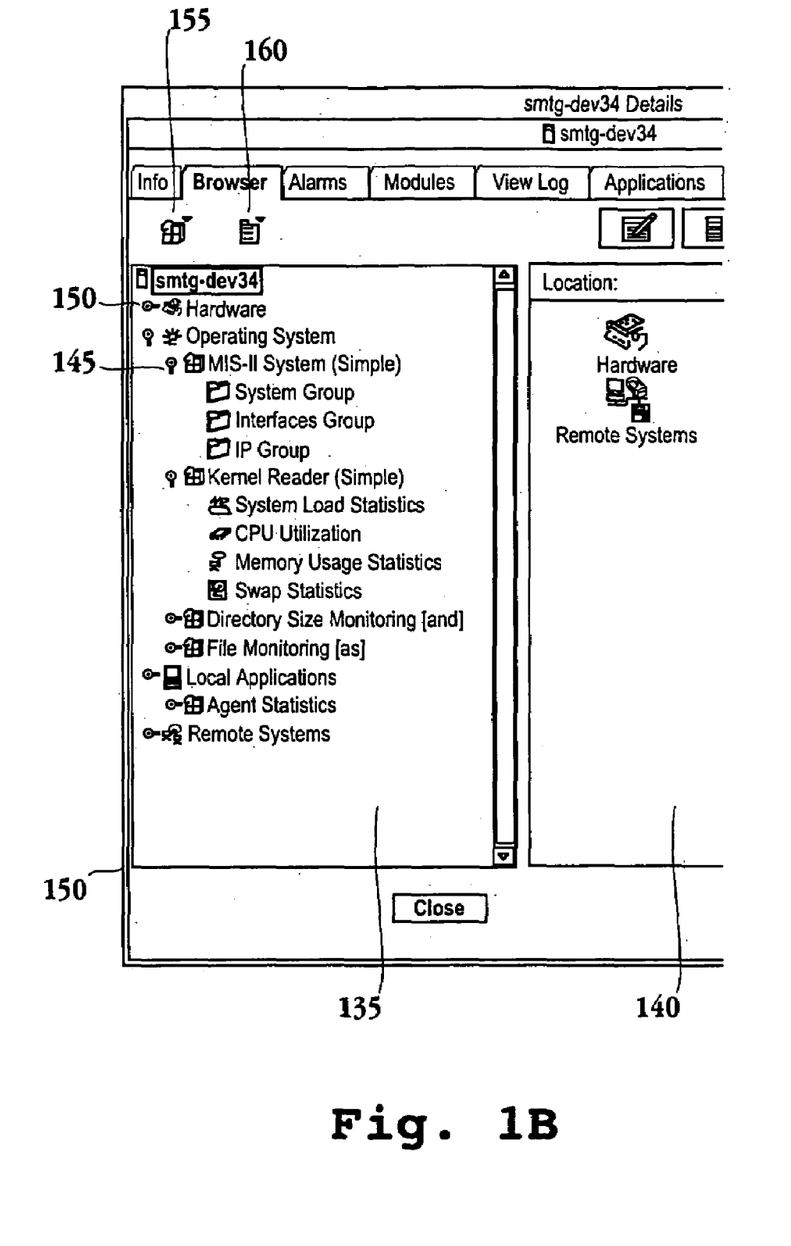
FIG. 1B is an exemplary screen shot of a prior art computer network management system of FIG. 1A

The prior art network management environment shown in FIG. 1A supports graphic application interface based consoles. When the user logs into server 110, the user is provided a browser window as shown in FIG. 1B. The browser window 130 shown in FIG. 1B is a screen shot illustration of the main browser window that the user sees when the user logs into the network management system 100. The browser window 130 comprises a hierarchy view window 135, a contents view window 140, expansion icon 145, compression icon 150, module icon 155 and options icon 160.

The hierarchy window 135 provides the user with a hierarchy view of the relationship between the host and its modules. The hierarchy view defines named objects in a hierarchy or tree relationship to one another. Objects are grouped depending on the rank of the object in the hierarchy. In the example shown in FIG. 1B, the host has a loaded operating system module MIB-II instrumentation (simple), etc. The user can browse the network by pointing and clicking on the particular resource the user wishes to access in the hierarchy view window 135 or the content view window 140. By using the browser window 130, the user can set system parameters and view a graph of monitored data properties for a particular. The expansion icon 145 and compression icon 150 enable the user to view an expanded or compressed graphical view of network resources.

Although the prior art system illustrated in FIG. 1A and FIG. 1B provides the user with the convenience of using a graphics application interface device to browse a particular network, the prior art system does not provide this functionality for users that do not have such graphics application interfaces such as text-based computer consoles, personal digital assistants (PDAs), etc.

SUMMARY OF INVENTION

Accordingly, there is provided a multi-host, network system comprising a network server having a text-based interface for text-based computing devices and provides text-based browsing of a computer network system without the need for a graphics application-based interface.

What is described herein is a computer network management system having a server with a command line interface for providing text-based browsing of a network topology. Embodiments of the present invention allow users to access corporate networks by hierarchically traversing the network using command line instructions to retrieve information from the network. The present invention allows users to manipulate data that is stored in network hosts using text commands without having to use graphics applications to monitor or manage the network hosts.

Embodiments of the present invention also include a command line interface system that allows users to remotely connect to the network management server from low bandwidth text-based computer systems to traverse the network topology and view information directories and files on the network. The command line interface system provides an alternative browsing method to a graphical user interface for monitoring and managing the network system.

Embodiments of the present invention also include a command transition state module for retaining and maintaining command states as the user traverses the network topology. Maintaining the command state of browsing commands enables the command line interface system to track the user's browsing path through the hierarchical topology of the network. The state module retains the state information for each hierarchical level that the user traverses in the network. The state module further retains the command state of navigating commands as the user browses the network.

Embodiments of the command line interface system of the present invention also include a session management module that allows users to invoke search commands without having to provide the entire search path information for hosts in the network. The session module maintains user's status information from when a user logs into the network server until the user terminates their session. The session module further maintains user handles to allow remote and console users to log into the network server.

Embodiments of the present invention further include a command module for providing a set of commands with predefined parameters to enable the user to traverse the network topology. The command module allows users to manipulate named objects and object attributes for topologies and network modules in the network environment. The command module further includes a parameter expansion scheme that allows a user to key in only part of a parameter name that is needed to fully identify that parameter within a command.

Embodiments of the present invention further include a command implementation module for implementing browsing commands used by the user to browse the network. The command implementation module further resolves command parameters that are provided in the browsing commands.

Embodiments of the present invention include a topology management agent that stores topology information of a network being monitored or managed. Information stored in the topology agent allows the user to view detailed topology information of the network. The topology information defines the members of a named object on a host in the network in a selected hierarchy.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to process data in a computer network system. In accordance with an aspect of the invention, a text-based browser for browsing network topology in a network management system provides users the ability to navigate network topologies using text-based character commands.

Figure 2:
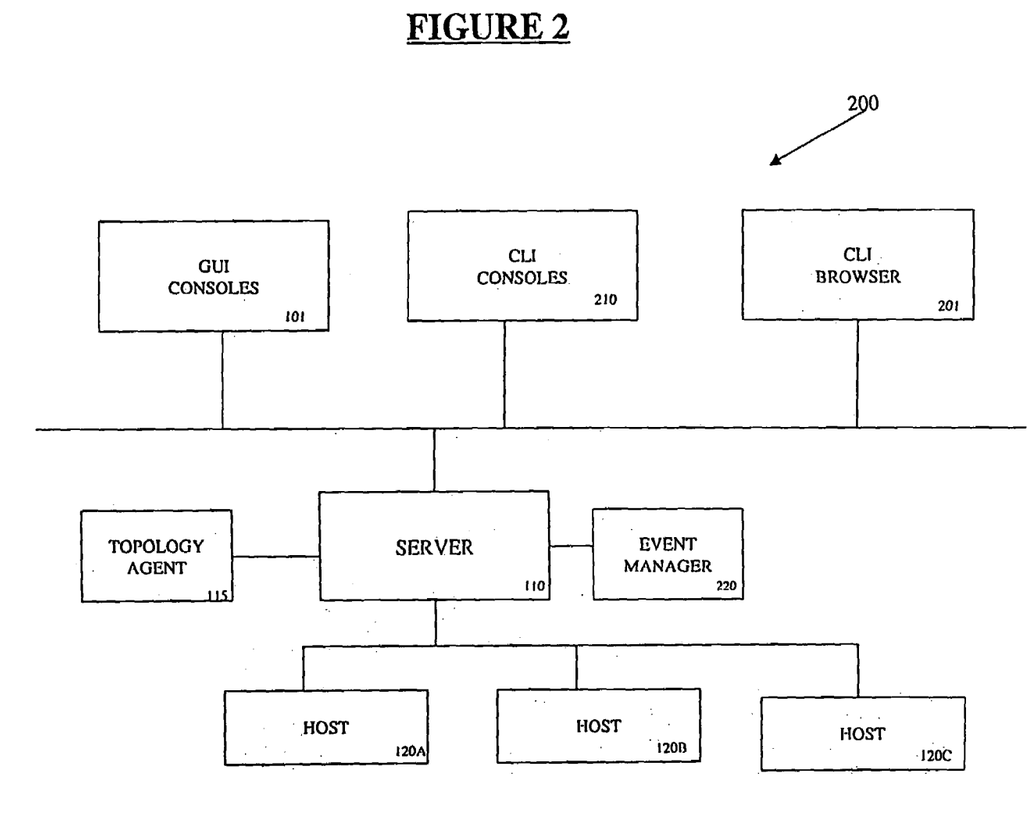
FIG. 2 is a block diagram of a computer network system in accordance with an embodiment of the present invention.

FIG. 2 is a block diagram depiction of one embodiment of a network management system 200. The network management system 200 illustrated in FIG. 2 comprises Graphic user interface consoles 101, command line interface (CLI) text-browsing system 201, server 110, topology agent 115, hosts 120A-120C, command line interface console 210 and event manager 220.

The GUI consoles 101 comprise multiple consoles serving multiple users for the network management system 200. The GUI consoles 101 provide graphics visual representations of managed objects (for example, hosts and networks) to users of the network management system 200. The GUI consoles 101 also provide users with the ability to manipulate attributes and properties associated with the managed objects and the ability to initiate management tasks (for example, dynamic reconfiguration of a host or a network) with graphics interface tools.

The command line interface consoles 210, on the other hand, provide users a text based interface to the network management software of the present invention. In one embodiment of the present invention, CLI consoles 210 are low bandwidth consoles for non-GUI users to browse the network. CLI consoles 210 allow user to issue command lines to retrieve topology information, create topology objects and to retrieve/manipulate managed objects.

The server 110 accepts requests from users through the consoles 101 and passes these requests to the appropriate hosts 120A-120C. The server 110 then relays the response from the agent back to the user. For example, if a user wants information on the number of users accessing a host, the server 110 receives this request from any one of consoles 101 or consoles 210, and sends the request to that particular host. The host finds the requested information and passes it back to the server 110 which then transmits the information to the user via the console 101 or 201. The server 110 provides the consoles 101 or consoles 210 with a secure entry point to interface with the hosts 120A-120C.

The hosts 120A-120C perform the actual information gathering, monitoring and management of objects on the nodes managed by the network management system 200 software. The server 110 interacts with the hosts 120A-120C to gain access to the managed objects.

The event manager 220 stores details about events and manages the characteristics of the hosts 120A-120C properties in the network environment. The event manager 220 manages information on the specific host properties, for example the threshold value for a the number of bytes of data that can be transferred by a host. When a threshold value required for data transfers for a particular host is reached, the host may send an alarm to the server 110 to indicate the occurrence of this event. The event manager 220 manages this information, as well as other information for both the hosts 120A-120C and the server 110.

Figure 3A:
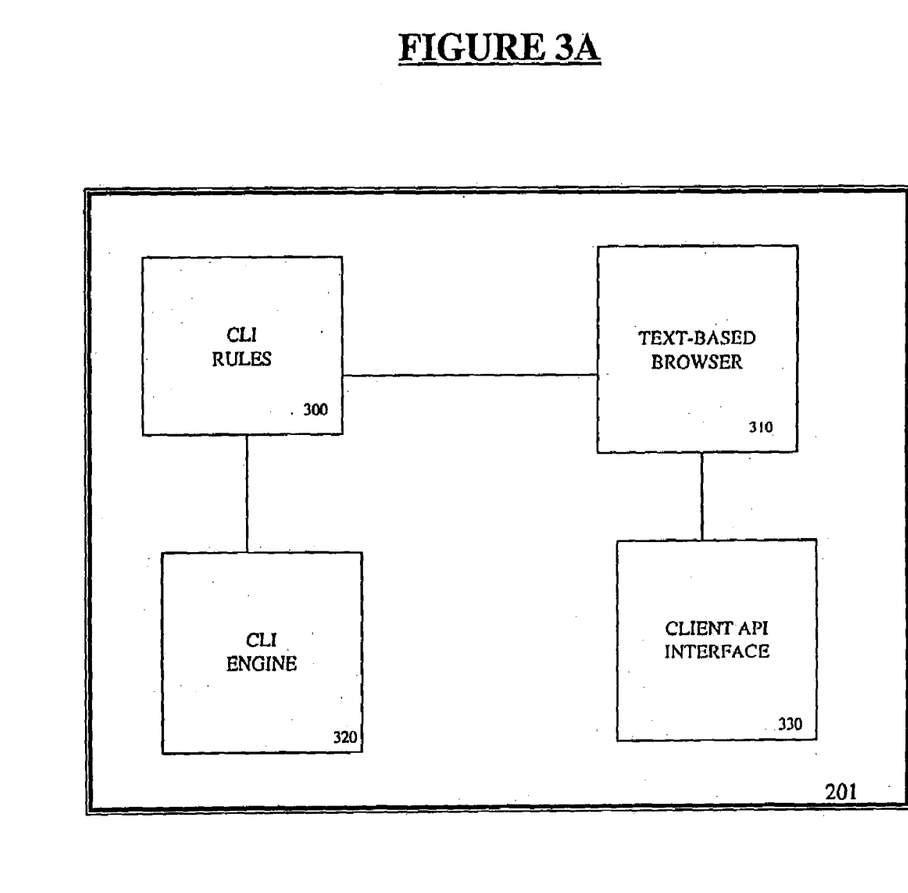
FIG. 3A is block diagram illustration of one embodiment of a command line interface console module of one embodiment of the present invention.

FIG. 3A is a block diagram of one embodiment of the command line interface (CLI) module 201 of the present invention. The CLI module 201 comprises CLI user interface module 300, text-based browser module 310, CLI engine module 320 and client API interface module 330. In one embodiment of the present invention, the CLI module 201 is a software based network management application that allows users to manage enterprise networks from low bandwidth computer devices by providing command line browsing capabilities and maintaining browsing state information as the user browses the network.

The CLI user interface 300 defines the user environment for the CLI module 201 in the network management system 200. In one embodiment of the present invention the CLI user interface 300 provides a secured user access that defines the host and port number on which a server is running and provides a system management login to the server 210. The user interface 300 also defines independence for the CLI commands from the graphics-based menus for managing and monitor the network.

Therefore, no command execution is required as a condition for execution of any other commands. An input logic also defines which operations that a user may specify to apply and where (scope and condition) to apply them. These specifications can be entered through a command line as parameters, or through an input file. An output file is also defined by the CLI user interface 300 to specified files and formatted as inputs to subsequent CLI commands.

Advantageously, the text-based browser module 310 provides the user the ability to browse the network topology on low bandwidth text-only consoles. In one embodiment of the present invention, when the network management system 200 is in browse mode, command line interface prompts will enable the console to display the current location in the network hierarchy that the user accesses. When in the browse mode, the default value for various search parameters are compiled based on the current location in the browsing hierarchy. By default, the user can be taken to the current network domain when the user logs into the system 200.

Still referring to FIG. 3A, the CLI engine 320 provides special purpose rules for determining the status of monitored hosts or nodes in the network. The CLI engine 320 may also check and manage modules programmed.

The client API interface 330 is used by the system 200 to implement all supported CLI operations in the server 200 and the console 210. The client API interface 330 also allows network topology utility files to be retrieved from database 115 or an ASCII file to be read or update data in the database 115. The client API interface 330 further enables the console 201 to communicate with other command line interface utility files stored in the server 210.

Figure 3B:
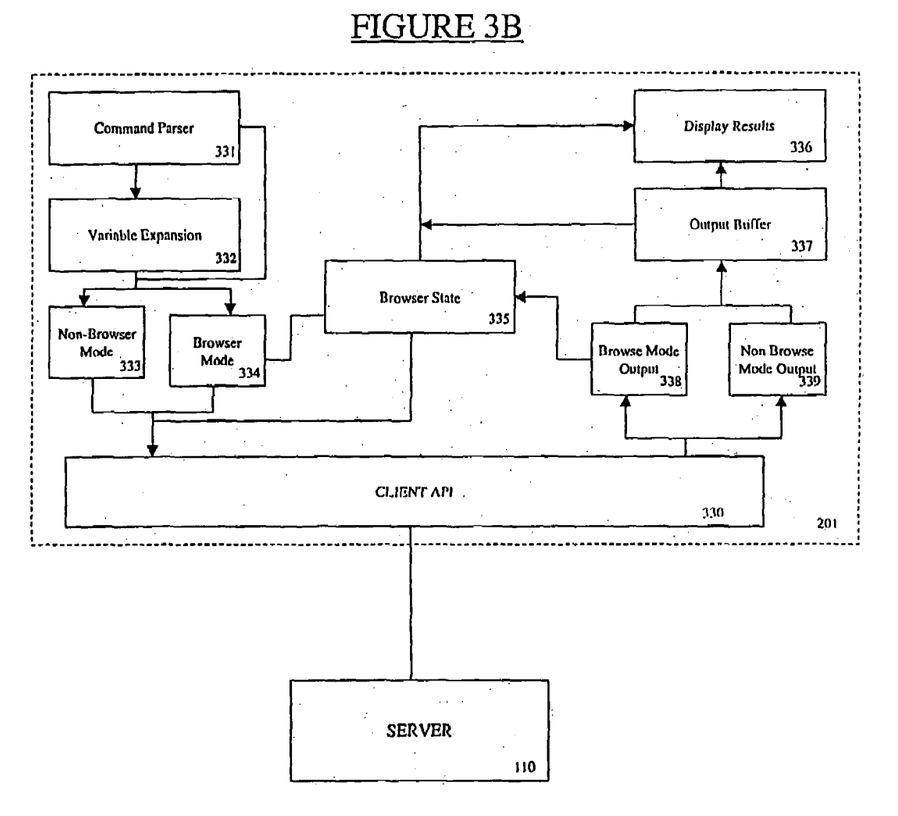
FIG. 3B is a block diagram illustration of an embodiment of the internal architecture of a command line interface module of the present invention.

FIG. 3B is a block diagram another embodiment of the internal architecture of a command line interface module 201 of the present invention. As shown in FIG. 3B, the command line interface module 201 comprises command client API 330, parser 331, variable expansion module 332, non-browser mode input module 333, browser mode input module 334, browser state module 335, browser mode output module 338, non-browser mode output module 339, output buffer 337 and display results module 336.

The command parser module 331 parses user commands presented to the CLI 201 and passes the parsed commands to the variable expansion module 332. The variable expansion module 332 allows the user to define user parameters that the user may use to browse the network. The variable expansion 332 enables the browsing of the network with user commands without having the user input an entire search command.

The non-browse mode input module 333 allows the user to traverse the network without having the benefit of the browsing capabilities of the CLI 210. To browse the network, the browse mode input module 334 provides the user with the command line browsing capabilities of the present invention.

The browse state module 335 stores the state information of the command line browsing commands as the user traverses the network. The browse state information is provided to the client API 330 via the browse mode input module 334 and the browse mode output module 338. The browse mode output module 338 generates the user's browse mode information to the browser state module 335 as the user traverses the network. Output information from a user traversing the network in a non-browse mode is provided to the output buffers 337 by the non-browse mode output module 339 for display by the display results module 336.

Figure 4:
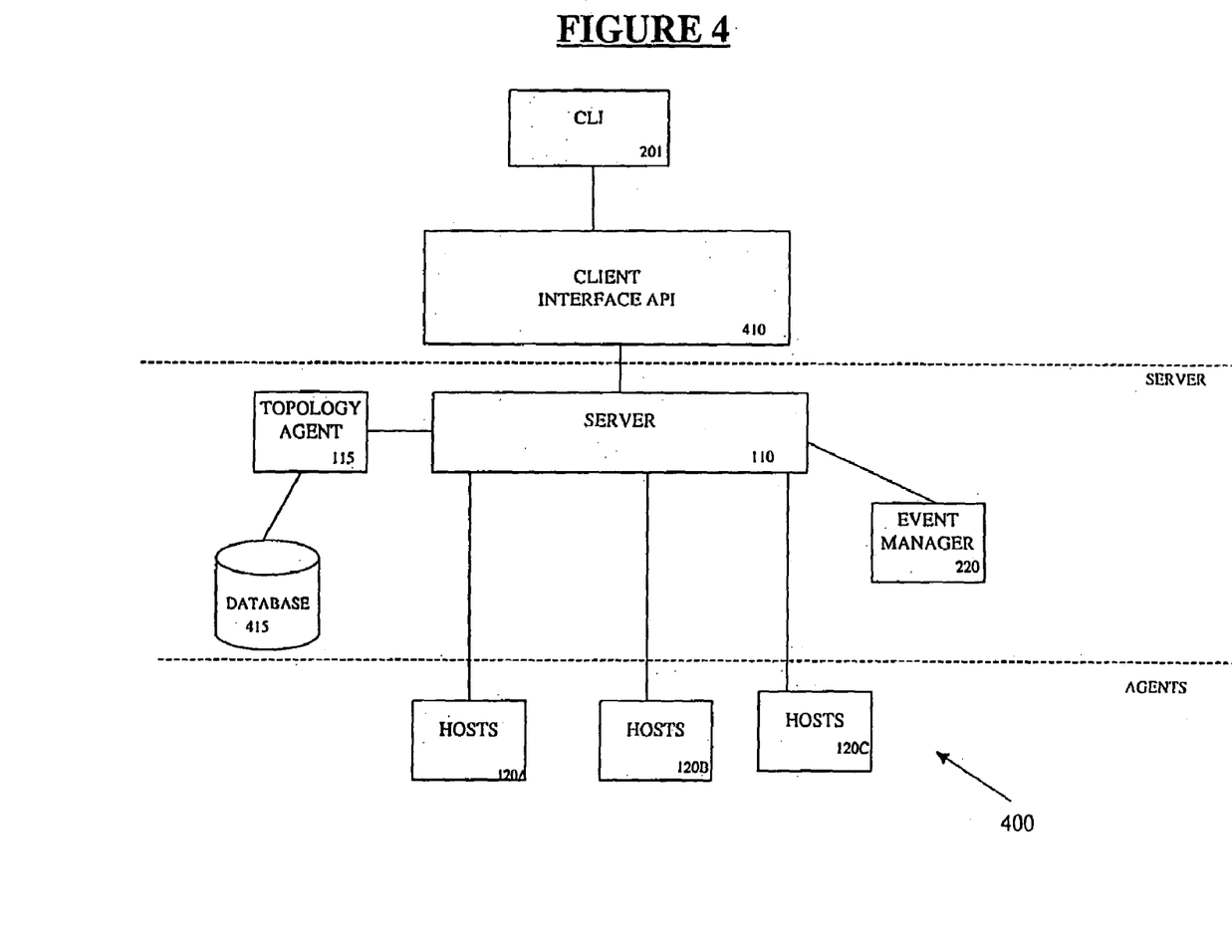
FIG. 4 is a block diagram illustration of one embodiment of the command line interface network management environment of the present invention.

Reference is now made to FIG. 4 which is a block diagram depiction of an exemplary embodiment of the network management system environment of the present invention. The exemplary environment 400 depicted in FIG. 4 comprises the CLI module 201, API interface 410, server 110, topology agent 115, database 415 and hosts 120A-120B. Embodiments of the text browsing system of the present invention allow users to use text commands to browse an entire corporate network.

The CLI module 201 allows users the use view, host and event information stored in the database 415 to perform topology view and hierarchy viewing of any hosts 120A-120B that is connected to the network 400. The CLI module 201 reads data from files in database 415 and updates topology information pertaining to each one of hosts 120A-120B. The client API 410 enables the server 110 to support both GUI console and non-GUI console in the network 400.

Figure 5:
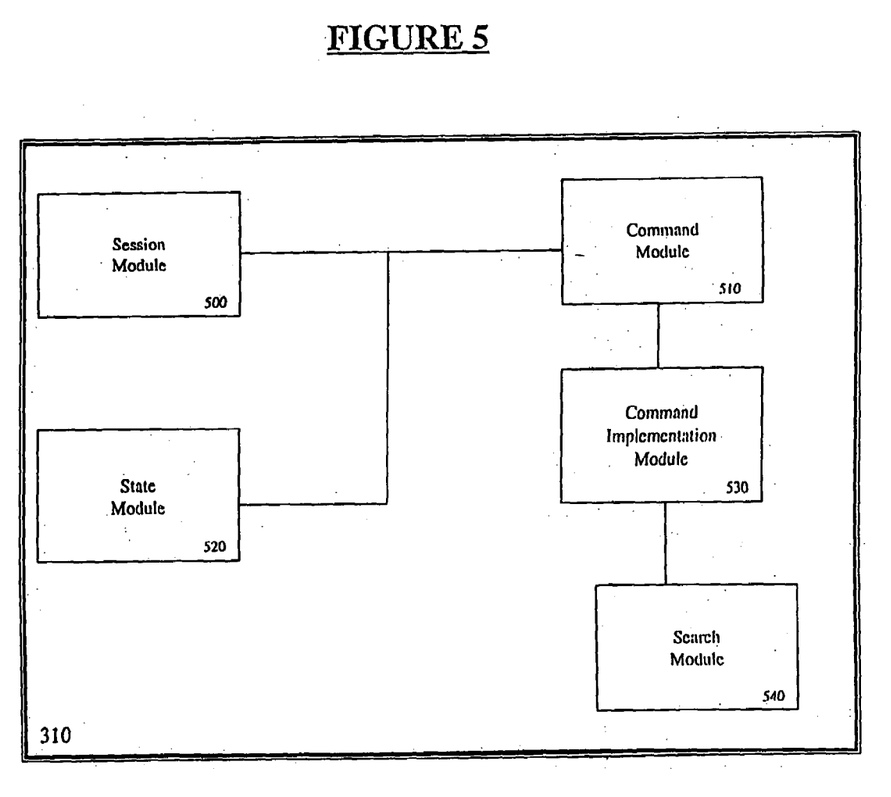
FIG. 5 is a block diagram of an embodiment of the text-based browser module of the command line interface module of the present invention.

FIG. 5 is a block diagram illustration of one embodiment of the text-based browser 310 of the present invention. The text-based browser 310 comprises a session module 500, command module 510, state module 520, command implementation module 530 and topology search module 540.

The session module 500 provides a connection to the server 110 to provide browsing service when a user begins to use the network management software of the system 200. The session module 500 is efficient in the networked environment when the user applies multiple requests to remote servers.

The session module 500 begins operation when the user invokes the network monitoring software without providing specific operation on a command line. The session module 500 maintains the user's status during the time the user is logged into the system 200. The exit status of the login command establishes connection and authentication of the session, but does not attempt to indicate the success of individual operations. In one embodiment of the present invention, the session module 500 maintains user handles to allow a user to connect to the server 110.

The command module 510 provides a set of commands with predefined parameters to help the user retrieve the information needed from the network. The command module 510 allows the user to retrieve and manipulate objects and object attributes for topologies and modules in the network environment. In one embodiment of the present invention, parameters passed on the command line are available to the user throughout a user's session.

The parameters are a list of "name=value" pairs, and in one implementation, with values encapsulated in quotes (if they contain white space), with pairs separated by whitespace, and with no whitespace between the parameter name, the equals sign and the quoted value. In one embodiment of the present invention, a parameter expansion scheme is used to allow a user to key in only part of a parameter name which is needed to fully identify that parameter within a command.

If the specified parameter is ambiguous then an error is displayed to the user. In one embodiment of the present invention, a parameter name is deemed ambiguous when it can potentially expand to multiple valid parameter names for that command.

In one embodiment of the present invention, the command module 510 supports two types of command types: a basic command and an extended command. The basic command allows the user to run commands in the foreground. When the user is in the basic command mode, the user is not able to run any subsequent commands until the current command has stopped running.

The extended command allows the user to run commands in the background by default (unless the foreground command parameter is set to "on"). In one embodiment of the present invention, only one command can run in the background at any time. Commands that run in the background do not produce any output to the user's console screen to indicate its success or failure. Typically, errors encountered are also not displayed to the user.

In one embodiment of the present invention, whenever a browse command is keyed into the system 200, a corresponding browse method is invoked. The browsing method determines and resolves the target topology object name first. The browsing method then uses the target topology object name/path to determine the topology type. The target topology path and the type is then used by various browse commands to perform the requested operation.

The state of a user's current session and the command(s) being executed by the user are tracked by the state module 520 to retain the current state information in browse mode. The output of browse commands is affected by the current state of the browse command as the user traverses the network topology.

The state module 510 retains state information from the root node that the user logs into to the managed property or fields of named objects in the network topology. A user's session and command state is retained until the user either terminates the session or exits out of a command operation. In one embodiment of the present invention, the state information is retained for each hierarchical level of the network topology that the user traverses to enable the user to perform "top-to-bottom" or "bottom-to-top" searches of the network.

The command implementation module 530 implements command parameters issued by the user at the CLI prompt in the user's console. The command implementation module 530 determines how the CLI commands in text-browser mode are executed or resolved.

In one embodiment of the present invention, the command implementation module 530 resolves command parameters in the following order: (1) commands line specified parameters have first priority over other commands; (2) parameter value as specified earlier during the session using set command; (3) if in browse mode, current value of the location will be utilized to compute parameter value for the domain, topology object, agent, module, managed object and managed property; and (4) if the parameter name can still not be deduced an error message is displayed.

The search module 540 provides both a hierarchical and topological browsing of objects of the network being monitored. The hierarchical browsing enables the user to navigate or traverse the network topology to find named objects of interest to the user. A topological browsing enables users to view contents and display members of a named object that is selected in the network hierarchy.

Figure 6A:
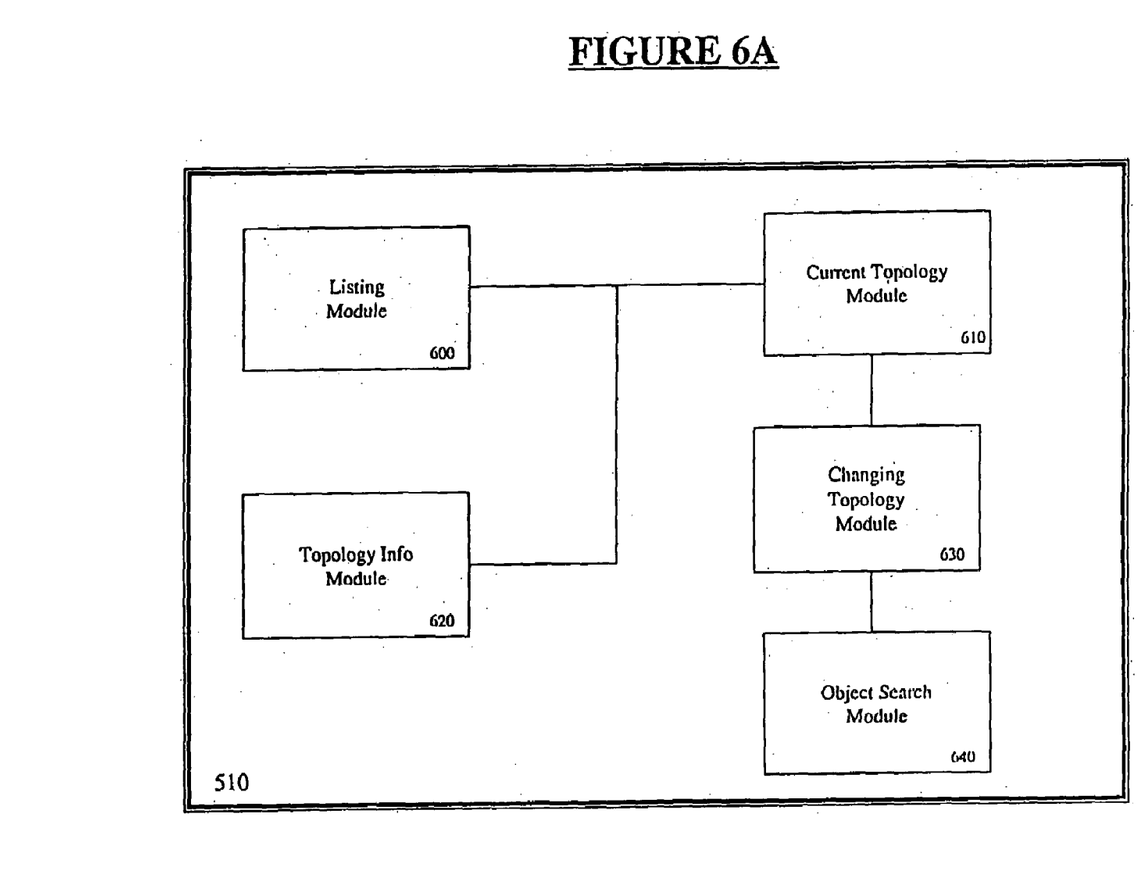
FIG. 6A is a block diagram of one embodiment of the command module of the text-based browser of the present invention.

Reference is now made to FIG. 6A which is a block diagram illustration of one embodiment of the text-browser based command module 510. The command module 510 comprises listing module 600, current topology module 610, topology information module 620, changing topology module 630 and object search module 640.

To traverse the network topology hierarchy and view information the listing module 600 provides a listing command which can take an optional topology object argument to list objects under a specified topology. If the topology argument is specified in the user's command, the objects topology is listed. Otherwise, objects under the current topology object are listed. Commands outputs from the listing module 600 depends on the current topology location.

In one embodiment of the present invention, the listing module 600 uses the following logic to determine the command output of the listing module 600: (1) if the specified topology object is root then all the domains will be listed. The domain information for a host can be retrieved using a client API method; (2) if the specified topology object is a domain, group or composite object then all the objects under the specified topology object will be shown; (3) if the specified topology object is a host then all the loaded modules on that host will be shown. Loaded modules on a host can be retrieved using client API method; (4) if the specified topology object is a module then all the managed objects/tables in that module will be displayed. The managed object information for a module can be retrieved using client API method; (5) if the specified topology object is a managed object (table) then all managed properties (fields) under that managed object will be shown. Managed properties for a managed object can be retrieved using client API method; (6) if the specified topology object is a managed property then nothing is displayed; (7) If the specified topology object is not found then an exception will be thrown.

The current topology module 610 provides a routine to calculate the current value of browse mode state variables for the domain, topology object, module, table and fields for the network topology.

The topology information gathering module 620 displays information specific to the specified topology object requested by the user. The topology object can either be specified as an argument or the current value of the topology object may be used. The output of the command will vary depending upon the specified topology object.

In one embodiment of the present invention, a method browse info routine is invoked when the user keys in an info command. In one embodiment of the present invention, the method will display output based on the specified topology object type based on the following logic (1) If root is the specified topology object then the method's output will display information about the server the user has logged on to, server port number connected on, the user name and the version number (2) If a domain name is the specified then the output will display information about that domain (3) If groups/subnets/host/module/table/properties is specified as the topology object then data will display information such as, the IP address, host name, label, netmask, etc. (3) An attribute command issued by the user will display attributes of a particular managed property, starting from the domain level. It is the command-line equivalent of an attribute editor in the GUI console. Attributes or qualifiers are the shadow properties associated with the system 200.

Topology attributes module 630 displays attributes of a topology object, starting from a domain. In one embodiment of the present invention, a browse command "attrib" displays the attributes of a topology object. The "attrib" command invokes a browse routine which obtains attributes for a particular topology object. The command accepts three parameters, namely: "group", "name", and "key."

The group parameter defines a group attribute as its value. If it is not specified, a list of attribute groups of the current topology object is displayed. The name parameter takes in the name of an attribute as its parameter. If it is not specified, all the attributes of a group is displayed. The key parameter displays key(s) of the attribute(s) of a particular topology object. An exemplary algorithm to invoke the "attrib" search command is shown below:

```
Void browseAttrib(ClCLIData in, ClCLIData) {
    // Get the current topological location
    ..
    if (data -key) {
        displayAttributeKeys( );
    } else {
        displayAttributeDetails( );
    }
}
```

Still referring to FIG. 6A, the object search module 640 supports the search of network topology objects. Browse commands can locate display objects matching the specified topology label that the user wishes to access. The search module 640 can also display objects matching specified topology labels and will allow access to those objects. In one embodiment of the present invention, the scope of search of the search module 640 is from the current topology level in the browse hierarchy.

Browsing a Topology Hierarchy

Figure 6B:
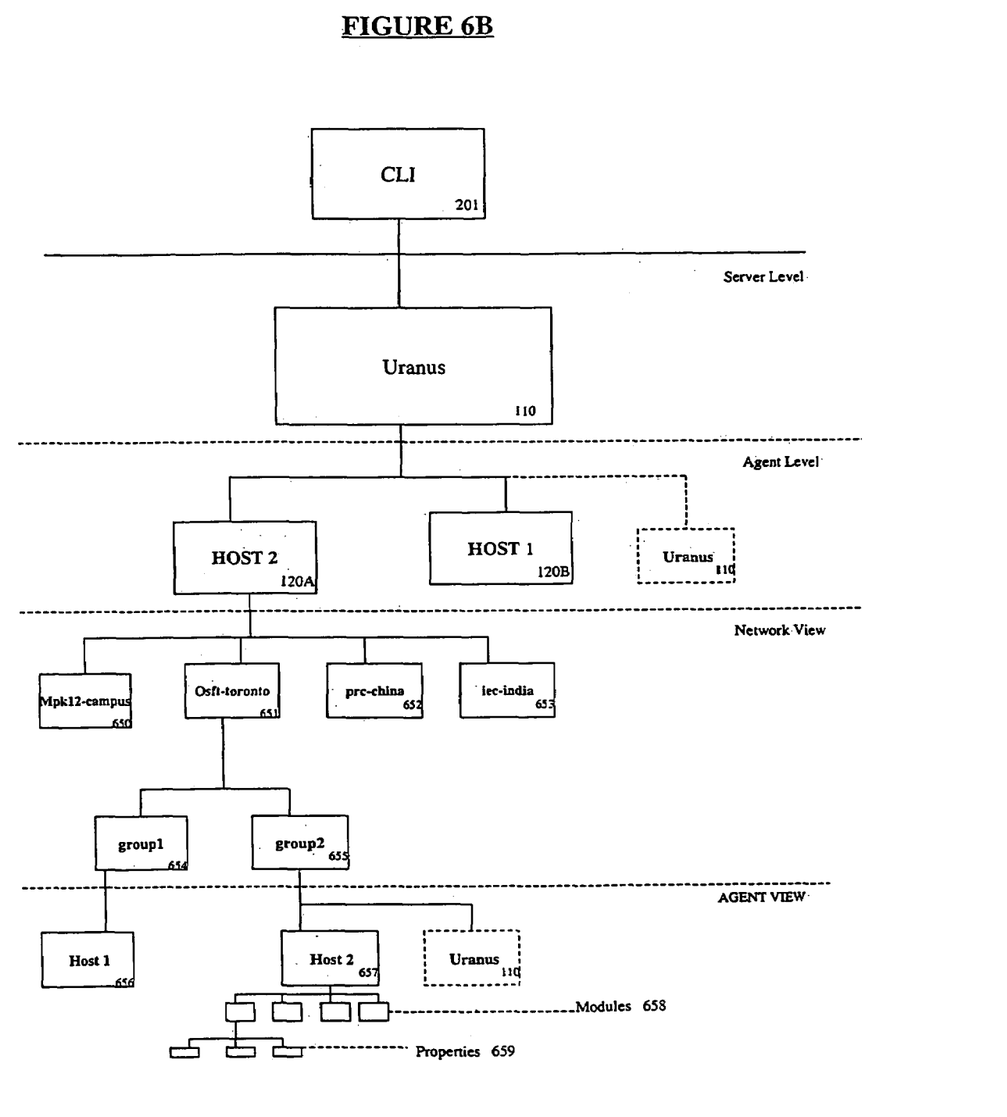
FIG. 6B is a block diagram illustration of one embodiment of a text-based browsing of a network topology hierarchy of the present invention.

FIG. 6B is a block diagram illustration of one embodiment of a network topology hierarchy of the present invention. In the illustration shown in FIG. 6B, a user may browse a target network by initiating a browse command at the command prompt in the connecting low bandwidth device 201. To start browsing the topology hierarchy, the user may key in the browse command as shown:
Connecting hostname>browse
Connecting host defaultDomain>

In browse mode the CLI prompt will always display the current location in the hierarchy. When in browse mode the default values for various parameters are computed based on the current location in the browsing hierarchy. By default the user is taken to the current domain. The value of the current domain can be set by the user. The browsing session is terminated by the user keying in the browse command "end."

In the browse mode the CLI prompt will be set to the current topology object which will be a combination of the sever host name and the current topology object. For example, if the current level in the topology hierarchy is "defaultDomain.group.host2" on server uranus 110 the prompt will be shown below:
Uranus host2>

The browse command "List" provides a list of all the topology objects at the current level. A list for domain displays the network, group and host information. A list for network displays the sub-nets, groups and hosts information. A list for sub-nets displays the groups and hosts information and so on. For example, a list command at the CLI 201 on uranus 110 will show the following objects residing in host2 120A as the default domain:
Uranus host2>list
1. mkpk12-campus 650
2. osft-toronto 651
3. prc-china 652
4. iec-india 653

If the user wishes to further examine the detail configuration of groups under any of the objects listed above, the user may key in the list command with the object name, for example,
uranus host2>list osft-toronto 651
1. group1654
2. group2655

The user can retrieve information about a topology object by using the browse command "data." If the browse command "data" is invoked without any argument, then the information for the current topology object is displayed. Depending on the level and type of object specified, the output of the data command will vary. The user can issue the "data" command to view information on a domain, a group, a host, a module, a table within a module or a field inside a table. The following example illustrated the information that is displayed when the "data" command is used for a host and a group object:
Uranus host2>where
\defaultDomain\osft-toronto\group\host2
uranus host2>data
   Description: host 2
   Full Description: SUNW, Ultra-6.0
   Host Name: host2
   IP address: 192.135.200.212
   NetMask: 255.255.255.0
   Operating System: Sun OS 6.0
   Family: sun4u-Sun-Ultra-6.0
   Trap Destination: 192.135.200.200.

Figure 7:
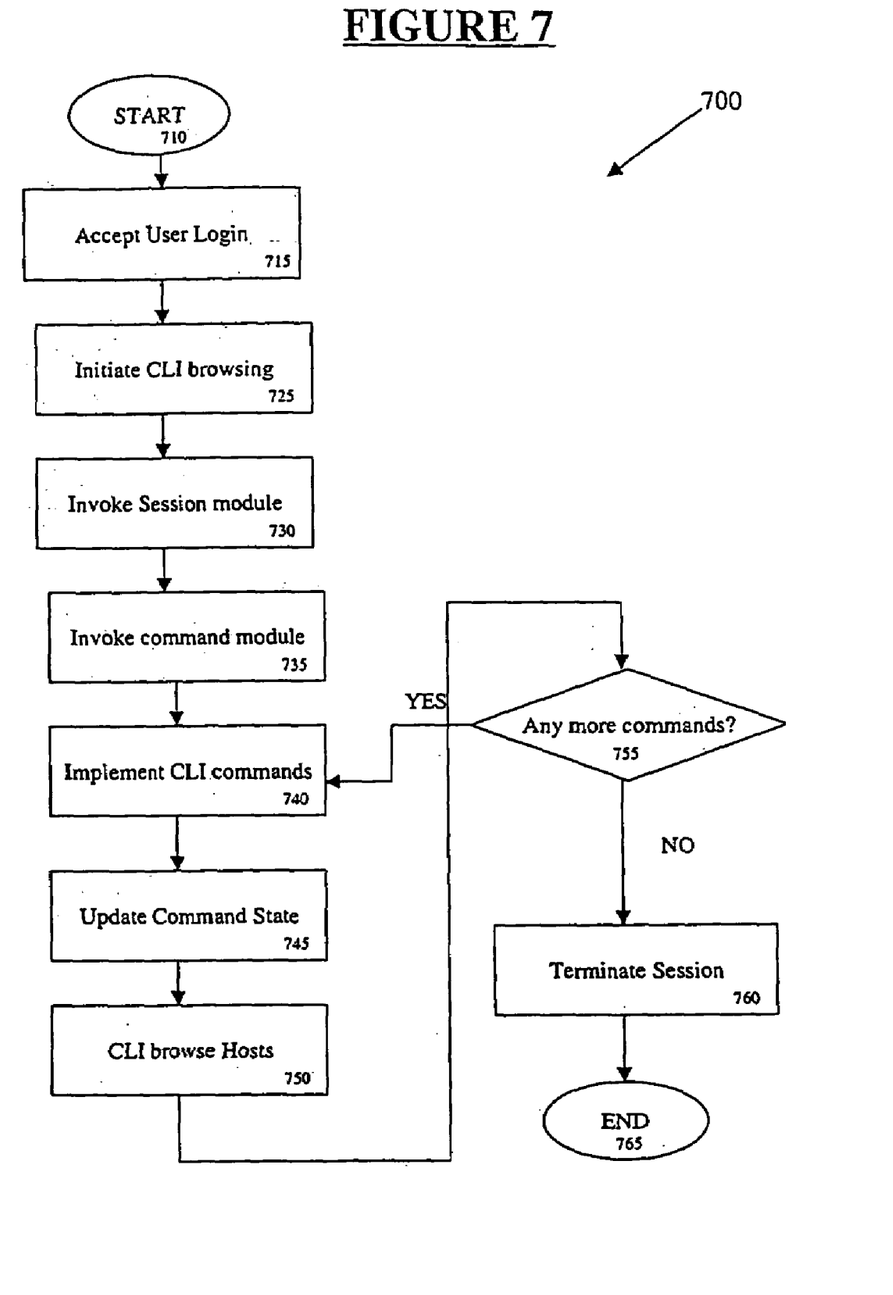
FIG. 7 is a flow diagram of one embodiment of the command line interface text-based browsing system of the present invention.

FIG. 7 is a computer implemented flow diagram illustration of one embodiment of the command line interface browsing system of the present invention. Command line browsing of a network commences 710 when the user logs into the network 110 to access a particular host on the network. At the step 715, the network server 110 accepts the user's login information including the user's login device.

At step 720, the server 110 checks the user's login device to determine if the user is logging in from a low bandwidth device (e.g., text-base only device). If the user is logging in from a low bandwidth device, processing continues at step 725. Otherwise, the server 110 terminates the user's login session.

At step 725, upon detecting the user's login device to be a low bandwidth device, the server 110 initiates the command line interface browsing system 201. Initiating the command line interface browsing system 201 allows the user to then begin browsing the network using text characters. At step 730, the command line interface browsing system 201 invokes the session module 500 to track the user's browsing activity on the network.

After invoking the session module 500, the command line interface browsing system 201 invokes the command module 510 at step 735 to provide the user with a set of commands and predefined parameters to facilitate the user's browsing of the network. The command line interface browsing system retains the command status state of each command the user issues to browse the network at step 740. By retaining the command status state, the system 201 is able to maintain a log of commands state that the user uses during a browsing session.

At step 745, the command line interface browsing system 201 invokes the implement CLI command module in response to commands entered into the system by the user. The browse commands entered into the system by the user enables the user to browse the targeted host at step 750 when the command line interface browsing system 201 invokes the browse search module 520.

At step 755, the command line interface browsing system 201 checks the command line prompts at the user's console to determine whether the user is entering any more commands. If the user has any more commands pending, processing continues at step 745. Otherwise, processing continues at step 760 when the command line interface browsing system 201 terminates the current user session and ends the user's browsing operation at step 765.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A computer network system, comprising:
   a server comprising a text-based console interface, said server maintaining hierarchical and topology information of said computer network system;
   a plurality of computer network hosts;
   a text-based console;
   a command line interface browsing system for allowing text-based browsing of said plurality of computer network hosts; and
   a command module providing a set of text-based commands including a basic command set for allowing users to execute said set of text-based commands in a foreground mode on said text-based console and an extended command set for allowing users to execute said set of text-based commands in a background mode on said text-based consoles.

2. The computer network system of claim 1, wherein said command line interface browsing system comprises a session module for connecting a user of said text-based console to said server.

3. The computer network system of claim 2, wherein said session module further maintains said user's login status in said server.

4. The computer network system of claim 3, wherein said command line interface browsing system further comprises a command browsing state module for retaining the browsing states of a user traversing the hierarchy and the topology of said plurality of computer network hosts.

5. The computer network system of claim 4, wherein said command module enables said user to traverse said computer network system.

6. The computer system of claim 5, wherein said set of text-based commands comprise predefined parameters that enable users to retrieve and manipulate named objects from the hierarchy and the topology information of said plurality of computer network hosts.

7. The computer network system of claim 6, wherein said command line interface system further comprises a command implementation module for implementing command parameters issued by a user to traverse said computer network system.

8. The computer network system of claim 7, wherein said command line interface system further comprises a topology search module for providing hierarchical and topological browsing of objects of said computer network system.

* * * * *